(12) United States Patent
Fedusa et al.

(10) Patent No.: US 11,802,581 B1
(45) Date of Patent: Oct. 31, 2023

(54) METHODS FOR FASTENING

(71) Applicant: Howmet Aerospace Inc., Pittsburgh, PA (US)

(72) Inventors: Anthony J. Fedusa, Lower Burrell, PA (US); Donald J. Spinella, Greensburg, PA (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 0 days.

(21) Appl. No.: 17/906,122

(22) PCT Filed: Mar. 15, 2021

(86) PCT No.: PCT/US2021/022285
§ 371 (c)(1),
(2) Date: Sep. 12, 2022

(87) PCT Pub. No.: WO2021/202089
PCT Pub. Date: Oct. 7, 2021

Related U.S. Application Data

(60) Provisional application No. 63/004,546, filed on Apr. 3, 2020.

(51) Int. Cl.
*F16B 5/04* (2006.01)
*B23K 11/11* (2006.01)
(Continued)

(52) U.S. Cl.
CPC .................. *F16B 5/04* (2013.01); *B21J 15/08* (2013.01); *B23K 11/0066* (2013.01);
(Continued)

(58) Field of Classification Search
CPC .......... B21J 15/02; B21J 15/025; B21J 15/08; B23K 11/0066; B23K 11/115; B23K 11/20; B23K 2103/18; F16B 5/04; F16B 5/08
See application file for complete search history.

(56) References Cited

U.S. PATENT DOCUMENTS

| 2019/0134738 A1 | 5/2019 | Spinella et al. | |
| 2020/0147671 A1* | 5/2020 | Iwase | B23K 9/0026 |
| 2022/0297221 A1* | 9/2022 | Hashimura | B23K 9/232 |

FOREIGN PATENT DOCUMENTS

| JP | 2014-173683 A | 9/2014 |
| JP | 2018-122333 A | 8/2018 |

(Continued)

OTHER PUBLICATIONS

International Search Report and Written Opinion of the International Searching Authority for International Application No. PCT/US2021/022285 dated Jun. 25, 2021.

*Primary Examiner* — Matthew P Travers
(74) *Attorney, Agent, or Firm* — K&L Gates LLP

(57) ABSTRACT

Methods of fastening are provided. A method comprises contacting a fastener with a first layer of an assembly at a first location. The assembly comprises the first layer, a third layer, and a second layer positioned intermediate the first layer and the third layer. The first layer, the third layer, and the fastener are electrically conductive. The second layer defines a gap and the first location is in communication with the gap. Electrical communication is formed between the assembly and the fastener. The first layer is fastened to the third layer through the gap in the second layer with the fastener. The fastening comprises resistance welding the fastener to the third layer.

21 Claims, 7 Drawing Sheets

(51) Int. Cl.
*B21J 15/08* (2006.01)
*B23K 11/00* (2006.01)
*F16B 5/08* (2006.01)
*B21J 15/02* (2006.01)
*B23K 103/18* (2006.01)

(52) U.S. Cl.
CPC .............. *B23K 11/115* (2013.01); *F16B 5/08* (2013.01); *B21J 15/025* (2013.01); *B23K 2103/18* (2018.08)

(56) References Cited

FOREIGN PATENT DOCUMENTS

| | | |
|---|---|---|
| JP | 2019-000891 A | 1/2019 |
| KR | 10-2018-0040176 A | 4/2018 |

\* cited by examiner

METHODS FOR FASTENING

FIELD OF USE

The present disclosure relates to methods for fastening.

BACKGROUND

Current methods of fastening work pieces together, such as fastening sheets together, can include the use of, for example, self-piercing rivets and/or flow drill rivets. Other methods of fastening can utilize a resistance spot rivet welding system. There are challenges associated with utilizing rivets to fasten work pieces together.

SUMMARY

In an aspect, a method for fastening is provided. The method comprises contacting a fastener with a first layer of an assembly at a first location. The assembly comprises the first layer, a third layer, and a second layer positioned intermediate the first layer and the third layer. The first layer, the third layer, and the fastener are electrically conductive. The second layer defines a gap and the first location is in communication with the gap. Electrical communication is formed between the assembly and the fastener. The first layer is fastened to the third layer through the gap in the second layer with the fastener. The fastening comprises resistance welding the fastener to the third layer.

In another aspect, a method for fastening is provided. The method comprises contacting a fastener with a first layer of an assembly at a first location. The assembly comprises the first layer, a third layer, and a second layer positioned intermediate the first layer and a third layer. The first layer, the third layer, and the fastener are electrically conductive. The second layer defines a gap and the first location is in communication with the gap. A material of the second layer differs from a material of the first layer or a material of the third layer. An electrode of a resistance welding device is contacted with the fastener and an electrically conductive pathway is formed between the electrode, the fastener, and the assembly. The first layer is fastened to the third layer. The fastening comprises resistance welding the fastener to the third layer through the gap in the second layer with the fastener utilizing the electrode. A metallurgical bond forms between the fastener and the third layer. The second layer is fastened to the first layer or the third layer. The fastening comprises resistance welding the second layer to the first layer or the third layer utilizing the electrode. The metallurgical bond forms between the second layer and the first layer or the third layer.

It is understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein.

Corresponding reference characters indicate corresponding parts throughout the several views. The exemplifications set out herein illustrate certain non-limiting embodiments, in one form, and such exemplifications are not to be construed as limiting the scope of the appended claims in any manner.

DETAILED DESCRIPTION OF NON-LIMITING EMBODIMENTS

Figure 1:
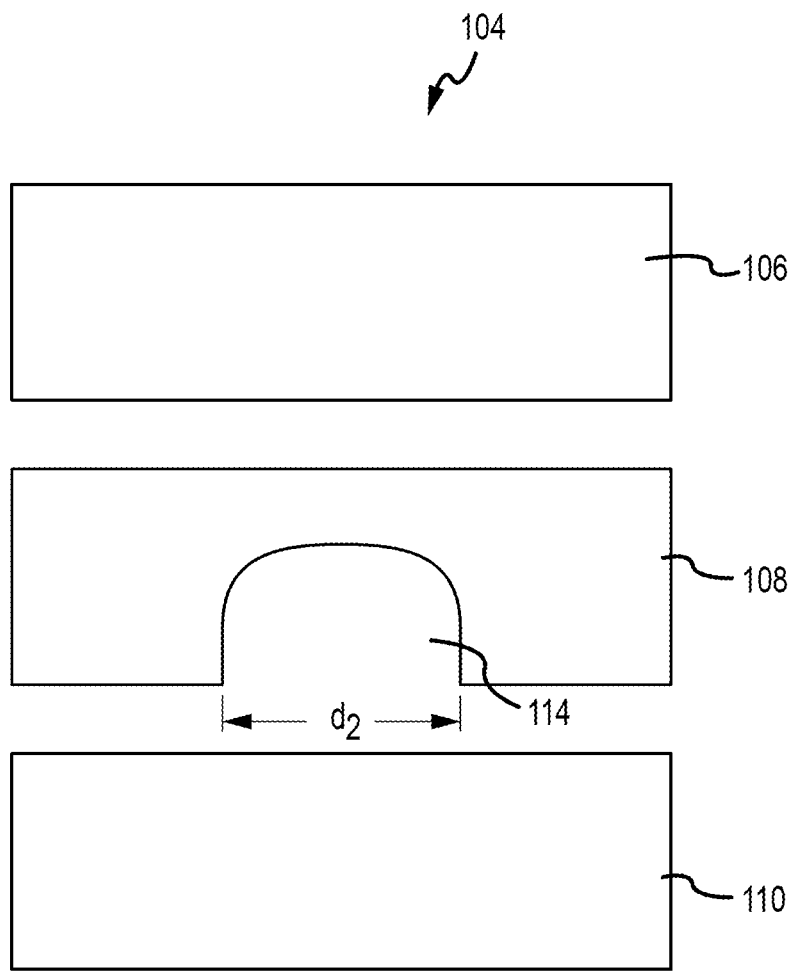
FIG. 1 is a top view of a non-limiting embodiment of a first layer, a second layer, and a third layer arranged side-by-side according to the present disclosure.

Various examples are described and illustrated herein to provide an overall understanding of the structure, function, and use of the disclosed systems, apparatus, and methods. The various examples described and illustrated herein are non-limiting and non-exhaustive. Thus, the inventions are not limited by the description of the various non-limiting and non-exhaustive examples disclosed herein. Rather, the inventions are defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various non-limiting embodiments disclosed and described in this specification can comprise, consist of, or consist essentially of the features and characteristics as variously described herein.

Any reference herein to "various embodiments," "some embodiments," "one embodiment," "an embodiment," or a like phrase means that a particular feature, structure, or characteristic described in connection with the example is included in at least one embodiment. Thus, appearances of the phrases "in various embodiments," "in some embodiments," "in one embodiment," "in an embodiment," or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments, without limitation. Such modifications and variations are intended to be included within the scope of the present embodiments.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural and the use of a plural noun includes the singular, unless the context of the usage requires otherwise.

As used herein, a referenced element or region that is "intermediate" two other elements or regions means that the referenced element/region is disposed between, but is not necessarily in contact with, the two other elements/regions. Accordingly, for example, a referenced element that is "intermediate" a first element and a second element may or may not be adjacent to or in contact with the first and/or second elements, and other elements may be disposed between the referenced element and the first and/or second elements.

Self-piercing rivets and/or flow drill rivets may not be able to penetrate and/or fastener together various high hardness steels and aluminums. Thus, the applications for self-piercing rivets and/or flow drill rivets can be limited.

Resistance Spot Rivet (RSR™) technology can allow joining of a variety of parts and assemblies made from various combinations of materials, such as, for example, high hardness steels and aluminums. RSR™ technology employs rivets (e.g., metallic rivets) of various geometries and materials to offer a selection of solutions to match each joining scenario. In RSR™ technology, rivets may be applied to a joint using conventional resistance spot welding guns (e.g., transguns). The welding guns can be paired with a robotic manipulator and/or a pedestal welder and integrated into a system of auxiliary components. The components may perform operations including, for example, rivet handling, rivet sorting and orientation, rivet staging and feeding, rivet transfer, and presentation of the rivet to the electrode of the welding gun. Each joint created by an RSR™ riveting system typically consumes a single rivet.

However, when joining materials together using rivets, the head and/or tail of the rivet usually protrudes outwards from a sheet line of a material with which the rivet engages. The distance the rivet protrudes from the sheet line of the material may lead to undesired interference in additional manufacturing steps. For example, in automotive applications, rivets placed in window surrounds, roofs and door openings may interfere with seals to be placed over the rivets. Thus, the seals may have to include intricate features to properly seal to the rivets and/or the quality of a moisture seal may be reduced, which can make rivets undesirable in these applications. Thus, the present disclosure provides a method that can reduce the distance the rivet protrudes from the sheet line of the material such that the rivets will minimally, if at all, interfere with additional manufacturing steps. For example, the distance the rivets protrude from the sheet line of the material may not or may only minimally interfere with seals in window surround and door openings and/or reduce the intricacy of the design of the seals. In various non-limiting embodiments, the present disclosure can enable a reduced flange width of a window frame assembly for an automobile thereby decreasing the weight of the window frame assembly and/or improving visibility through the window frame. Accordingly, the present disclosure enables the efficient and effective use of rivets in desired applications.

Referring to FIG. 1, a non-limiting embodiment of a first layer 106, a second layer 108, and a third layer 110 are provided. The layers 106, 108, and 110 can be suitable to form an assembly 104 as described with respect to FIG. 2. The first layer 106 and the third layer 110 can each comprise a metal or a metal alloy. Additionally, the first layer 106 and the third layer 110 can each be electrically conductive. For example, the first layer 106 and the third layer 110 can be configured to electrically communicate with a resistance spot rivet welding system. The first layer 106 and the third layer 110 can comprise the same material or different materials. In various non-limiting embodiments, the first layer 106 and the third layer 110 can comprise at least one of aluminum, an aluminum alloy, iron, an iron alloy (e.g., a steel), titanium, and a titanium alloy.

The second layer 108 can comprise, for example, at least one of a metal, a metal alloy, and a composite. The second layer 108 can be electrically conductive or electrically insulative. The composite can comprise at least one of a polymer and a laminate sheet or panel (e.g., REYNOBOND® composite panel, which includes two coated aluminum sheets laminated to both sides of a fire-resistant core). The second layer 108 and the third layer 110 can comprise the same material or a different materials, and the second layer 108 and the first layer 106 can comprise the same material or different material. In various non-limiting embodiments, the second layer 108 comprises a different material than at least one of the first layer 106 and the third layer 110. For example, the second layer 108 can comprise a material that cannot be welded to at least one of the first layer 106 and the third layer 110.

In various non-limiting embodiments, the first layer 106 can comprise aluminum (e.g., the first layer 106 can be aluminum sheet) and the third layer 110 can comprise steel (e.g., the third layer 110 can be steel sheet). In various non-limiting embodiments, both the second and third layers 108 and 110 comprise steel, which can be the same steel grade or different steel grades. Regardless of the steel grade, the second and third layers 108 and 110 can comprise materials that can be welded together. In other non-limiting embodiments, the first and second layers 106 and 108 both comprise aluminum, which can be the same aluminum grade or different aluminum grades. Regardless of the aluminum grade, the first and second layers 106 and 108 can comprise materials that can be welded together. In certain non-limiting embodiments, the second layer 108 comprises a composite, which may not be weldable to either the first layer 106 or the third layer 110.

Figure 3:
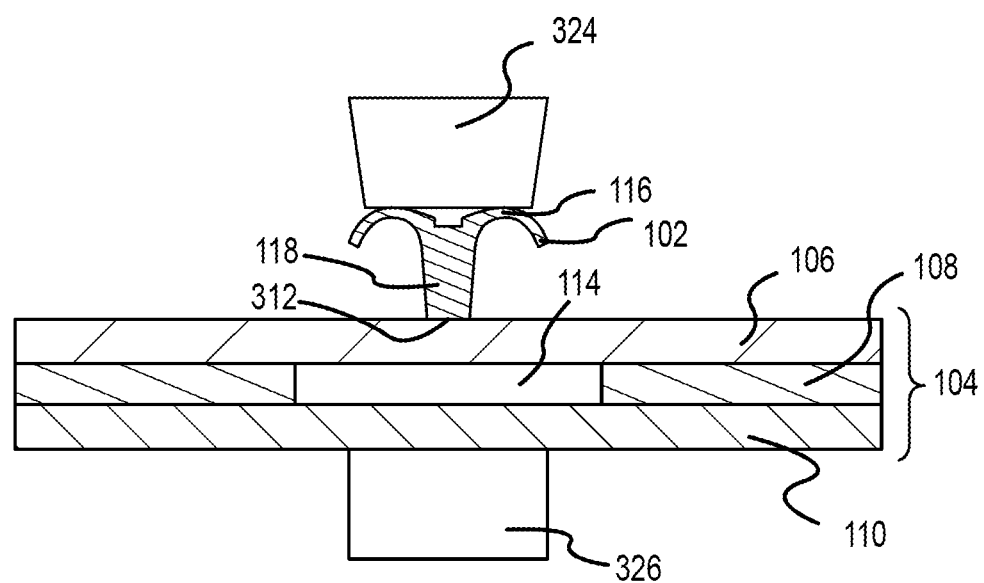
FIG. 3 is a cross-sectional side view of the fastener of FIG. 2 contacting the assembly of FIG. 2, further showing electrodes of a resistance spot rivet welding system that are engaged with the fastener and assembly.

The second layer 108 can define a gap 114 (also shown in FIG. 3). The gap 114 can be defined by removing at least a portion of the second layer 108 to form the gap 114. For example, removing at least a portion of the second layer 108 can comprise stamping, machining, cutting, grinding, punching, and/or drilling the second layer 108. The gap 114 can create void space suitable to receive a portion of the first layer 106. Thus, the gap 114 can allow for deformation of the first layer 106 into the gap 114. Additionally, the gap 114 can reduce the weight of the assembly 104 which, for example, in automotive applications, can increase fuel economy and reduce cost of the assembly 104.

The gap 114 in the second layer 108 can comprise a dimension, $d_2$, no greater than 200 mm, such as, for example, no greater than 100 mm, no greater than 50 mm, no greater than 40 mm, no greater than 30 mm, no greater than 25 mm, no greater than 20 mm, or no greater than 15 mm. The dimension, $d_2$, can be at least 5 mm, such as, for example, at least 10 mm, at least 12 mm, at least 15 mm, at least 20 mm, at least 25 mm, at least 30 mm, at least 40 mm, at least 50 mm, or at least 75 mm. For example, the dimension, $d_2$, can be in a range of 5 mm to 200 mm, such as, for example, 15 mm to 75 mm, 10 mm to 15 mm, 12 mm to 15 mm, 5 mm to 50 mm, 20 mm to 100 mm, 25 mm to 100 mm, or 25 mm to 50 mm. In various non-limiting embodiments, the second layer 108 can comprise multiple gaps (not shown). In certain non-limiting embodiments, the multiple gaps can be arranged substantially linearly proximal to an edge of the assembly 104. In various non-limiting embodiments, the dimension, $d_2$, can be adjusted to reduce weight of the assembly 104 and/or achieve a desired spacing of fasteners and/or metallurgical bonds.

Figure 2:
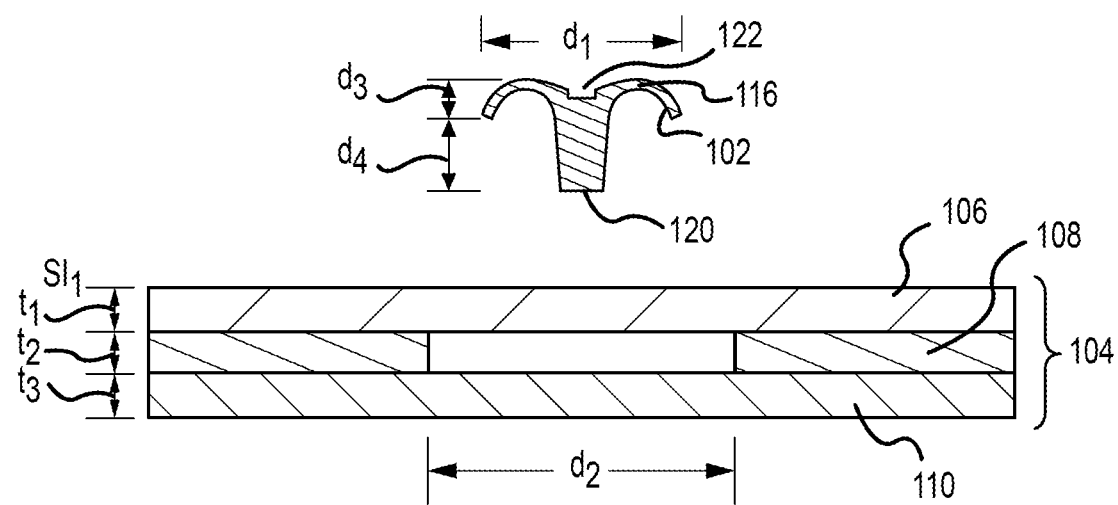
FIG. 2 is a cross-sectional side view of a non-limiting embodiment of a fastener and an assembly formed from the layers of FIG. 1 arranged in a stack according to the present disclosure.

A non-limiting embodiment of a method of fastening according to the present disclosure can comprise positioning the second layer 108 intermediate the first layer 106 and the third layer 110 to form the assembly 104 as illustrated in FIG. 2. For example, the second layer 108 can be positioned in contact with the first layer 106 and the third layer 110. In various non-limiting embodiments, an additional layer or additional layers (not shown) may be positioned within the assembly 104. In certain non-limiting embodiments, the outermost layers of the assembly 104 can be electrically conductive. In other non-limiting embodiments, an outermost layer of the assembly 104 can be electrically insulative and comprise a pilot bore through the electrically insulative outermost layer such that a fastener can pass through the pilot bore and into contact with an electrically conductive layer of the assembly 104.

The first layer 106 can comprise a thickness, $t_1$, the second layer 108 can comprise a thickness, $t_2$, and the third layer 110 can comprise a thickness, $t_3$. In various non-limiting embodiments each thickness, $t_1$, $t_2$, and $t_3$, can be in a range of 0.1 mm to 20 mm, such as, for example, 0.25 mm to 5 mm, 0.8 mm, to 3.5 mm, 0.5 mm to 3 mm, 0.8 mm to 4 mm, 0.5 mm to 5 mm, 0.75 mm to 2 mm, 2 mm to 15 mm, 1 mm to 10 mm, 1 mm to 5 mm, or 5 mm to 10 mm. For example, the thickness, $t_1$, can be 1 mm, and the thicknesses, $t_2$ and $t_3$, can each be 1.6 mm. In various non-limiting embodiments where a select layer comprises steel, the thickness of the select steel layer can be in a range of 0.5 mm to 3.0 mm. In various non-limiting embodiments where a select layer comprises aluminum, the thickness of the select aluminum layer can be in a range of 0.8 mm to 3.5 mm. In certain non-limiting embodiments where a select layer comprises a composite, the thickness of the select composite layer can be in a range of 0.8 mm to 4.0 mm.

A weld-through adhesive can be deposited on at least one of the first layer 106, the second layer 108, and the third layer 110 prior to forming the assembly 104. The weld-through adhesive can be intermediate the first layer 106 and the second layer 108 and/or intermediate the second layer 108 and the third layer 110 in the assembly 104. A weld-through adhesive may not inhibit a welding operation performed on the assembly 104. The weld-through adhesive can be cured in order to form a bond between the desired layers. For example, the weld-through adhesive may be used between layers that comprise different materials (e.g., materials that cannot be welded to one another). In various non-limiting embodiments, the weld-through adhesive can be cured after fastening the first layer 106 to the third layer 110 with the fastener 102 as described with respect to FIG. 5 below.

The dimension, $d_2$, can be at least as great as a diameter, $d_1$, of the head 116 of the fastener 102, such as for example, at least 1 mm greater than the diameter, $d_1$; at least 2 mm greater than the diameter, $d_1$; at least 3 mm greater than the diameter, $d_1$; at least 4 mm greater than the diameter, $d_1$; at least 5 mm greater than the diameter, $d_1$; at least 10 mm greater than the diameter, $d_1$; at least 15 mm greater than the diameter, $d_1$; at least 20 mm greater than the diameter, $d_1$; or at least 25 mm greater than the diameter, $d_1$. For example, the dimension, $d_2$, can be sized to enable a desired deformation of the first layer 106 to create a recess (e.g., recess 428 described with respect to FIG. 4 below) that can at least partially receive the head 116 of the fastener 102. Additionally, in various non-limiting embodiments, the thickness, $t_2$, can be sized to enable a desired deformation of the first layer 106 to create a recess that can at least partially receive the head 116 of the fastener 102.

The fastener 102 can be configured to contact and fasten the layers 106, 108, and 110 of the assembly 104 together utilizing a resistance spot rivet welding process. The fastener 102 comprises the head 116 and a shank 118, as shown in FIG. 3. The head 116 can be configured to engage an electrode 324 of a resistance spot rivet welding system as illustrated in FIG. 3, for example. Additionally, the head 116 can be configured to contact a layer of the assembly 104 after installation, as described with reference to FIG. 5. For example, referring again to FIG. 2, the head 116 can be configured to engage a layer of the assembly 104 (e.g., apply a holding force) and minimally, if at all, penetrate through the engaged layer while the shank 118 can be configured to pierce through the engaged layer during a resistance spot riveting welding process.

Additionally, the shank 118 can be metallurgically bonded to a layer of the assembly 104. The head 116 can extend around a periphery of the shank 118 and can comprise, for example, an annular shape. In various non-limiting embodiments, a cavity 122 can extend through the head 116 and at least partially into the shank 118. Further, in various non-limiting embodiments, the shank 118 can be tapered towards an end 120 of the fastener 102. The end 120 can be configured to engage and apply a localized pressure to a layer of the assembly 104.

The fastener 102 can comprise a metal or a metal alloy. For example, the fastener 102 can comprise an electrically conductive material suitable to withstand a resistance spot rivet welding process. In various non-limiting embodiments, the fastener 102 can comprise at least one of aluminum, an aluminum alloy, iron, an iron alloy, titanium, and a titanium alloy. For example, in certain non-limiting embodiments the fastener 102 can comprise at least one of iron, an iron alloy, titanium, and a titanium alloy. In various non-limiting embodiments, the fastener 102 can comprise the same material as the third layer 110. For example, the fastener 102 and the third layer 110 can each comprise a material that is weldable to the other. For example, the fastener 102 and the third layer 110 can comprise a steel. In various non-limiting embodiments, when the fastener 102 comprises aluminum, a pilot hole may be provided in the first layer 106.

In various non-limiting embodiments, the fastener 102 is a rivet. The head 116 of fastener 102 can comprise a diameter, $d_1$, that is at least 4 mm, such as, for example, at least 5 mm, at least 6 mm, at least 7 mm, at least 10 mm, at least 12 mm, at least 14 mm, at least 15 mm, at least 16 mm, at least 18 mm, at least 20 mm, at least 22 mm, at least 24 mm, or at least 25 mm. In various non-limiting embodiments, the head 102a of fastener 102 can comprise a diameter, $d_1$, no greater than 30 mm, no greater than 25 mm, no greater than 24 mm, no greater than 22 m, no greater than 20 mm, no greater than 18 mm, no greater than 16 mm, such as, for example, no greater than 15 mm, no greater than 14 mm, no greater than 12 mm, no greater than 10 mm, or no greater than 7 mm. For example, in certain non-limiting embodiments, the head 116 of the fastener 102 can comprise a diameter, $d_1$, in a range of 4 mm to 30 mm, such as, for example, 5 mm to 25 mm, 10 mm to 18 mm, 10 mm to 14 mm, 14 mm to 18 mm, 20 mm to 25 mm, or 12 mm to 14 mm.

Figure 4:
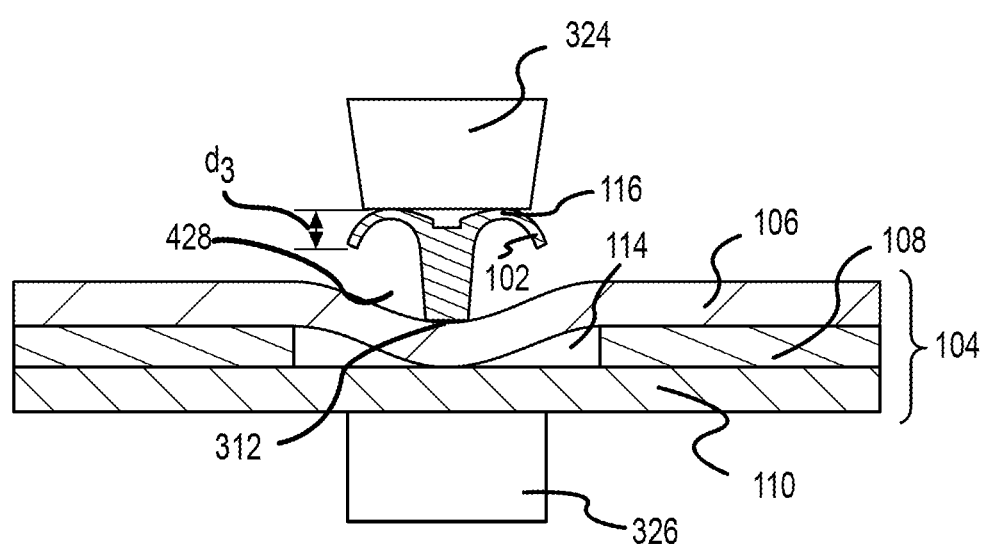
FIG. 4 is a cross-sectional side view of the fastener and the assembly of FIG. 3 after deformation of a first layer of the assembly.
Figure 5:
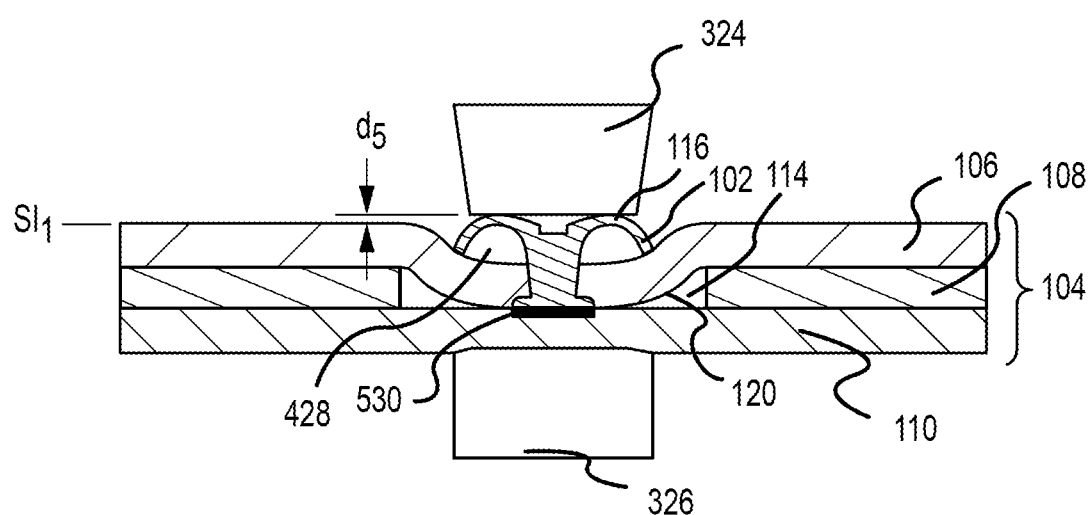
FIG. 5 is a cross-sectional side view of the fastener and the assembly of FIG. 4 and wherein a metallurgical bond has been formed between the fastener and a third layer of the assembly.

Referring to FIG. 4, the head 116 may not initially pierce through a layer of the assembly 104 that the fastener 102 engages upon installation and, thus, the distance, $d_3$, by which the head 116 extends protrudes away from the surface of the layer. In various non-limiting embodiments, the distance, $d_3$, can be at least 0.5 mm, such as, for example, at least 1 mm, at least 1.5 mm, at least 2 mm, or at least 3 mm. In various non-limiting embodiments, the distance, $d_3$, can be no greater than 5 mm, such as, for example, no greater than 4 mm, no greater than 3 mm, no greater than 2 mm, or no greater than 1.5 mm. For example, the distance, $d_3$, can be in a range of 0.5 mm to 5 mm, such as, for example, 1 mm to 3 mm, or 1 mm to 2 mm. The gap 114 and the distance, $d_3$, by which the head 116 extends can be sized relative to one another such that when the fastener 102 is installed into the assembly 104, the head 116 minimally, if at all, protrudes beyond a sheet line, $Sl_1$, of the first layer 106. For example, the distance, $d_3$, of the head 116 can be selected based on the thickness, $t_2$, of the second layer 108 such that when the fastener 102 is installed into the assembly 104, the first layer 106 can deform into the gap 114 in the second layer 108 to form the recess 428 such that the head 116 can be received by the recess 428 and minimally, if at all, protrudes beyond the sheet line, $Sl_1$, of the first layer 106. As used herein, and as illustrated in FIG. 5, the phrase "sheet line" refers to an imaginary line extending across the outer surface of a layer when the assembly 104 is viewed in cross-section.

Referring again to FIG. 2, the shank 118 can extend a distance, $d_4$, which can be at least 3 mm, such as, for example, at least 4 mm, at least 5 mm, or at least 6 mm. In various non-limiting embodiments, the distance, $d_4$, can be no greater than 10 mm, such as, for example, no greater than 9 mm, no greater than 8 mm, or no greater than 6 mm. For example, the distance, $d_4$, can be in a range of 3 mm to 10 mm, such as, for example, 4 mm to 9 mm, or 5 mm to 8 mm.

The shank 118 can comprise a diameter no greater than 10 mm, such as, for example, no greater than 7 mm, no greater than 6 mm, no greater than 5 mm, or no greater than 4 mm, or no greater than 3 mm. In various non-limiting embodiments, the shank 118 can comprise a diameter of at least 1 mm, such as, for example, at least 2 mm, at least 3 mm, at least 4 mm, at least 5 mm, at least 6 mm, or at least 7 mm. For example, the shank 118 can comprise a diameter in a range of 1 mm to 10 mm, such as, for example, 2 mm to 5 mm, 2 mm to 7 mm, or 3 mm to 6 mm. In certain embodiments, a diameter of the shank 118 can decrease in a direction away from the head 116. The diameter of the shank 118 can be less than a diameter of an electrode of a resistance spot rivet welding system such that the shank 118 can apply an increased localized force to a layer of the assembly 104 to deform the layer.

Referring to FIG. 3, the fastener 102 can be contacted with the first layer 106 of the assembly 104 at a first location 312. For example, the shank 118 can be contacted with the first layer 106 at the first location 312. Utilizing the shank 118 can provide an increased localized pressure on the first location 312 than if a first electrode 324 of the resistance spot rivet welding system was directly applied to the first location 312. The first location 312 can be in communication with the gap 114. The first electrode 324 can contact the fastener 102 and a second electrode 326 of the resistance spot rivet welding system can contact the third layer 110 to apply a clamping force to the assembly 104 and the fastener 102. In various non-limiting embodiments, prior to contacting the assembly 104 with the fastener 102, at least a portion of the second layer 108 is removed to form the gap 114.

In various non-limiting embodiments, the yield strength of the first layer 106 can be less than a yield strength of the third layer 110. Therefore, if a compressive force and/or heat is applied to the assembly 104, the first layer 106 may deform prior to and/or to a greater degree than the third layer 110. In various non-limiting embodiments, the thickness, $t_1$, of the first layer 106 can be sized relative to the third layer 110 such that if a compressive force and/or heat is applied to the assembly 104, the first layer 106 may deform prior to and/or to a greater degree than the third layer 110. Depending on the yield strength of the first layer 106 and/or the thickness, $t_1$, of the first layer 106, the first layer 106 can deform into a gap 114 defined in the second layer 108. The deformation of the first layer 106 can create a recess 428 suitable to receive the head 116 of the fastener 102 as described with respect to FIG. 4 below.

Referring again to FIG. 3, electrical communication can be formed between the assembly 104 and the fastener 102. For example, the first electrode 324 and a second electrode 326 can form an electrically conductive pathway between the electrodes 324 and 326, the fastener 102, and the assembly 104. The electrically conductive pathway can be suitable to conduct an electric current through the electrodes 324 and 326, the fastener 102, and the assembly 104, which can resistively heat and/or metallurgically bond at least two layers of the assembly 104, and/or resistively heat and/or metallurgically bond a fastener to a layer of the assembly 104.

In various non-limiting embodiments, the second electrode 326 can be a cooled electrode, such as, for example, a cooled copper electrode. Thus, the temperature of the third layer 110 that is in contact with the second electrode 326 can maintained at a temperature less than the first layer 106 at the first location 312. Therefore, the resistive heating caused by the electric current can be focused on the first layer 106.

The first layer 106 can be fastened to the third layer 110 through the gap 114 in the second layer 108 with the fastener 102. For example, the fastener 102 can be resistively welded to the third layer 110 by applying an electrical potential across the assembly 104 and the fastener 102 and passing an electrical current there through. In various non-limiting embodiments, the electrical potential can be applied across the assembly 104 and the fastener 102 by the electrodes 324 and 326 of the resistance spot rivet welding system. The electric current can resistively heat and soften the first location 312 of the first layer 106 such that the pressure applied by the end 120 of the fastener 102 to the first layer 106 deforms the first layer 102 into the gap 114, forming a recess 428 as illustrated in FIG. 4. Heating the first layer 102 at the first location 312 can enable high strength materials (e.g., high strength aluminum and/or high strength steel) to deform with minimal, if any, cracking and/or fracturing of the first layer 106. In various non-limiting embodiments, the gap 114 can enable increased heating of the first layer 106 at the first location 312 since the second layer 108 is not in direct contact with the first location 312 and therefore cannot directly conduct heat from the first location 312.

Referring to FIG. 5, the clamping force can be maintained to urge the fastener 102 through the first layer 106 at the first location 312 towards the third layer 110. In various non-limiting embodiments in which the fastener 102 and the first layer 106 are different materials, the fastener 102 may not weld to the first layer 106 and will pierce through the first layer 106 through the gap 114 towards the third layer 110. Thereafter, the fastener 102 can be urged into contact with the third layer 110. The fastener 102 can be resistance welded to the third layer 110 thereby forming a metallurgical bond 530 between the fastener 102 and the third layer 110. In various non-limiting embodiments in which the fastener 102 and the third layer 110 comprise materials that can be welded to each other, the fastener 102 may weld to the third layer 110 and secure the first layer 106 intermediate the head 116 of the fastener 102 and the third layer 110.

The head 114 of the fastener 102 can be at least partially positioned within the gap 114 and recess 428 formed therein after deforming the first layer 106. For example, after fastening the first layer 106 to the third layer 110 through the gap 114 in the second layer 108 with the fastener 102, the head 116 of the fastener 102 can protrude a distance, $d_s$, beyond the sheet line, $Sl_1$, of the first layer 106 no greater than 2 mm, such as, for example, no greater than 1.5 mm, no greater than 1 mm, no greater than 0.75 mm, no greater than 0.5 mm, no greater than 0.4 mm, or no greater than 0.25 mm. In various non-limiting embodiments, the fastener 102 may not protrude beyond the sheet line, $Sl_1$, of the first layer 106.

Figure 6:
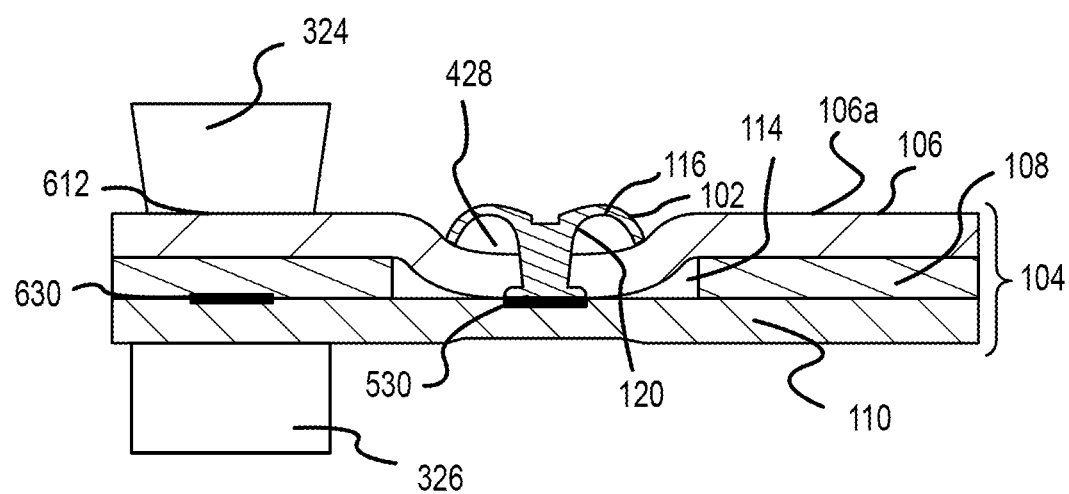
FIG. 6 is a cross-sectional side view of the fastener and the assembly of FIG. 5 and wherein a metallurgical bond has been formed between a second layer and the third layer of the assembly.
Figure 7:
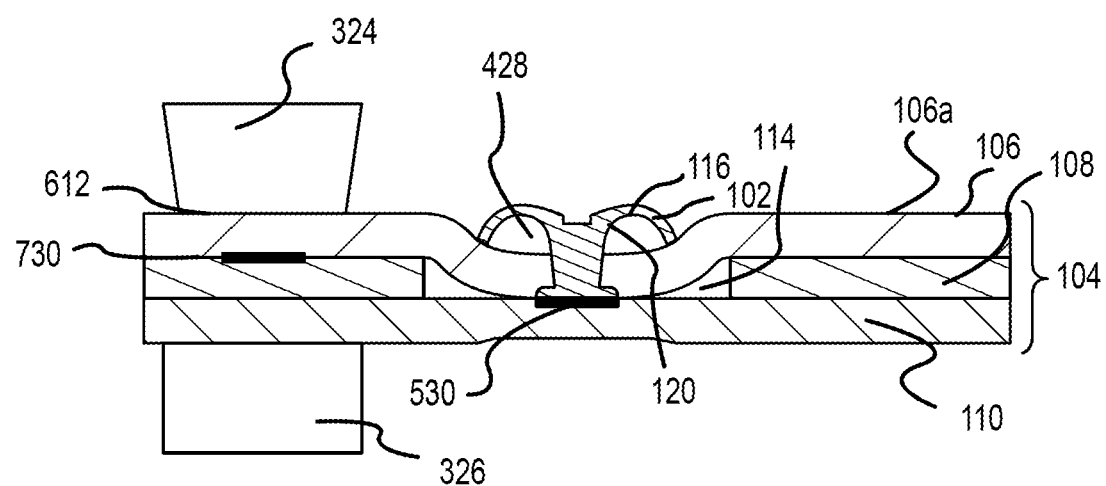
FIG. 7 is a cross-sectional side view of the fastener and the assembly of FIG. 5 and wherein a metallurgical bond has been formed between the first layer and a second layer of the assembly.

Referring to FIG. 6, the electrodes 324 and 326 can be repositioned such that the first electrode 324 engages a second location 612 on the first layer 106 and applies another electrical potential across the assembly 104, thereby resistance welding the second layer 108 to the third layer 110 and forming a metallurgical bond 630 therebetween, as illustrated in FIG. 6, or resistance welding the second layer 108 to the first layer 106 and forming a metallurgical bond 730 therebetween, as illustrated in FIG. 7. Thus, in various non-limiting embodiments, the same electrodes 324 and 326 can be used for the resistance spot rivet welding process and also for the resistance spot welding process. Therefore, minimal capital equipment may be required and process efficiency can be increased by performing both resistance spot rivet welding and resistance spot welding utilizing the same electrodes 324 and 326 and associated welding equipment.

Whether the second layer 108 is welded to the first layer 106 or the third layer 110 can depend on the material composition of the layers 106, 108, and 110 and the welding parameters. For example, if the first layer 106 comprises a material that can be welded to the second layer 108, then the first layer 106 and the second layer 108 can be welded together upon application of a desired electrical potential. If the third layer 110 comprises a material that can be welded to the second layer 108, then the third layer 110 and the second layer 108 can be welded together upon application of a desired electrical potential. In various non-limiting embodiments, if the first layer 106 and the third layer 110 both comprise a material that cannot be welded to the second layer 108, neither the first layer 106 nor the third layer 100 can be welded to the second layer 108. In certain non-limiting embodiments, the material of the second layer 108 differs from a material of the first layer 106 or a material of the third layer 110.

The process of fastening the first layer 106 to the third layer 110 by resistance welding a fastener to the third layer 110 can be repeated along the assembly 104 as desired. Additionally, the process of metallurgically bonding the second layer 108 to the first layer 106 and/or the third layer 110 as illustrated in FIG. 6 and FIG. 7 can be repeated as desired. In certain non-limiting embodiments, the process of fastening the first layer 106 to the third layer 110 by resistance welding a fastener to the third layer can be alternated with the process of metallurgically bonding the second layer 108 to the first layer 106 and/or the third layer 110 as illustrated in FIGS. 6 and 7.

Thus, non-limiting embodiments of the method for fastening according to the present disclosure can fasten together materials of various compositions and result in a reduced degree of fastener protrusion beyond a sheet line of a layer the fastener engages. Additionally, embodiments of the method for fastening according to the present disclosure can enable a desired weld quality such that a grade A weld can be achieved between a fastener and a layer.

Various aspects of certain non-limiting embodiments the inventions encompassed by the present disclosure include, but are not limited to, the aspects listed in the following numbered clauses.

1. A method for fastening, the method comprising:
    contacting a fastener with a first layer of an assembly at a first location, the assembly comprising the first layer, a third layer, and a second layer positioned intermediate the first layer and the third layer, wherein the first layer, the third layer, and the fastener are electrically conductive, and wherein the second layer defines a gap and the first location is in communication with the gap;
    forming electrical communication between the assembly and the fastener; and
    fastening the first layer to the third layer through the gap in the second layer with the fastener, wherein the fastening comprises resistance welding the fastener to the third layer.

2. The method of clause 1, further comprising, prior to the contacting, removing at least a portion of the second layer to form the gap, wherein the removing comprises one or more of stamping, machining, cutting, grinding, punching, and drilling.

3. The method of clause 2, further comprising, prior to the contacting, positioning the second layer intermediate the first layer and the third layer to provide the assembly.
4. The method of any one of clauses 1-3, wherein the fastener comprises a head and a shank, and wherein contacting the fastener with the first layer at the first location comprises contacting the shank with the first layer at the first location.
5. The method of clause 4, wherein fastening the first layer to the third layer through the gap in the second layer further comprises deforming the first layer at the first location into the gap in the second layer.
6. The method of clause 5, wherein the head of the fastener is at least partially positioned within a recess formed in the first layer after deforming the first layer.
7. The method of clause 6, wherein after fastening the first layer to the third layer through the gap in the second layer with the fastener, the head of the fastener protrudes no more than 1.5 mm beyond a surface of the assembly.
8. The method of any one of clauses 1-7, wherein the gap in the second layer comprises a dimension no greater than 50 mm.
9. The method of any one of clauses 1-8, wherein the first layer, the third layer, and the fastener each comprise a metal or a metal alloy, and the second layer comprises one or more of a metal, a metal alloy, and a composite.
10. The method of any one of clauses 1-9, wherein a yield strength of the first layer is less than a yield strength of the third layer.
11. The method of any one of clauses 1-10, wherein the first layer and the third layer comprise different materials.
12. The method of any one of clauses 1-11, wherein the second layer and the first layer or the third layer comprise the same material.
13. The method of clause 12, further comprising resistance welding the second layer to the first layer or the third layer thereby forming a metallurgical bond.
14. The method of any one of clauses 1-13, wherein resistance welding the fastener to the third layer comprises:
    applying an electrical potential across the assembly and the fastener, thereby resistance heating and softening the first location of the first layer;
    urging the fastener through the first layer at the first location toward the third layer; and
    contacting the fastener and the third layer and resistance welding the fastener to the third layer, thereby forming a metallurgical bond between the fastener and the third layer.
15. The method of clause 14, wherein applying an electrical potential across the assembly and the fastener comprises contacting the fastener with an electrode of a resistance welding device.
16. The method of clause 15, further comprising resistance welding the second layer to the first layer or the third layer utilizing the electrode of the resistance welding device and thereby forming a metallurgical bond between the second layer and the first layer or the third layer.
17. The method of any one of clauses 1-16, further comprising:
    depositing a weld-through adhesive on one or more of the first layer, the second layer, and the third layer; and
    curing the adhesive after fastening the first layer to the third layer through the gap in the second layer with the fastener.
18. A method for fastening, the method comprising:
    contacting a fastener with a first layer of an assembly at a first location, the assembly comprising the first layer, a third layer, and a second layer positioned intermediate the first layer and a third layer, wherein the first layer, the third layer, and the fastener are electrically conductive, wherein the second layer defines a gap and the first location is in communication with the gap, and wherein a material of the second layer differs from a material of the first layer or a material of the third player;
    contacting an electrode of a resistance welding device with the fastener and forming an electrically conductive pathway between the electrode, the fastener, and the assembly;
    fastening the first layer to the third layer, wherein the fastening comprises resistance welding the fastener to the third layer through the gap in the second layer with the fastener utilizing the electrode, wherein a metallurgical bond forms between the fastener and the third layer; and
    fastening the second layer to the first layer or the third layer, wherein the fastening comprises resistance welding the second layer to the first layer or the third layer utilizing the electrode, wherein a metallurgical bond forms between the second layer and the first layer or the third layer.
19. The method of clause 18, wherein resistance welding the fastener to the third layer through the gap in the second layer comprises deforming the first layer at the first location into the gap.
20. The method of clause 19, wherein after deforming the first layer a head of the fastener is at least partially positioned within a recess formed in the first layer by deforming the first layer.

One skilled in the art will recognize that articles and methods described herein, and the discussion accompanying them, are used as examples for the sake of conceptual clarity and that various configuration modifications are contemplated. Consequently, as used herein, the specific examples/embodiments set forth and the accompanying discussion is intended to be representative of their more general classes. In general, use of any specific exemplar is intended to be representative of its class, and the non-inclusion of specific components, devices, operations/actions, and objects should not be taken to be limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:
1. A method for fastening, the method comprising:
    contacting a fastener with a first layer of an assembly at a first location, the assembly comprising the first layer, a third layer, and a second layer positioned intermediate the first layer and the third layer, wherein the first layer, the third layer, and the fastener are electrically conductive, and wherein the second layer defines a gap and the first location is in communication with the gap;

forming electrical communication between the assembly and the fastener; and fastening the first layer to the third layer through the gap in the second layer with the fastener, wherein the fastening comprises resistance welding the fastener to the third layer;

wherein fastening the first layer to the third layer through the gap in the second layer further comprises deforming the first layer at the first location into the gap in the second layer.

2. The method of claim 1, further comprising, prior to the contacting, removing at least a portion of the second layer to form the gap, wherein the removing comprises one or more of stamping, machining, cutting, grinding, punching, and drilling.

3. The method of claim 2, further comprising, prior to the contacting, positioning the second layer intermediate the first layer and the third layer to provide the assembly.

4. The method of claim 1, wherein the fastener comprises a head and a shank, and wherein contacting the fastener with the first layer at the first location comprises contacting the shank with the first layer at the first location.

5. The method of claim 4, wherein the head of the fastener is at least partially positioned within a recess formed in the first layer after deforming the first layer.

6. The method of claim 5, wherein after fastening the first layer to the third layer through the gap in the second layer with the fastener, the head of the fastener protrudes no more than 1.5 mm beyond a surface of the assembly.

7. The method of claim 1, wherein the gap in the second layer comprises a dimension no greater than 50 mm.

8. The method of claim 1, wherein the first layer, the third layer, and the fastener each comprise a metal or a metal alloy, and the second layer comprises one or more of a metal, a metal alloy, and a composite.

9. The method of claim 1, wherein a yield strength of the first layer is less than a yield strength of the third layer.

10. The method of claim 1, wherein the first layer and the third layer comprise different materials.

11. The method of claim 1, wherein the second layer and the first layer or the third layer comprise the same material.

12. The method of claim 11, further comprising resistance welding the second layer to the first layer or the third layer thereby forming a metallurgical bond.

13. The method of claim 1, wherein resistance welding the fastener to the third layer comprises:
applying an electrical potential across the assembly and the fastener, thereby resistance heating and softening the first location of the first layer;
urging the fastener through the first layer at the first location toward the third layer; and
contacting the fastener and the third layer and resistance welding the fastener to the third layer, thereby forming a metallurgical bond between the fastener and the third layer.

14. The method of claim 13, wherein applying an electrical potential across the assembly and the fastener comprises contacting the fastener with an electrode of a resistance welding device.

15. The method of claim 14, further comprising resistance welding the second layer to the first layer or the third layer utilizing the electrode of the resistance welding device and thereby forming a metallurgical bond between the second layer and the first layer or the third layer.

16. The method of claim 1, further comprising:
depositing a weld-through adhesive on one or more of the first layer, the second layer, and the third layer; and curing the adhesive after fastening the first layer to the third layer through the gap in the second layer with the fastener.

17. A method for fastening, the method comprising:
contacting a fastener with a first layer of an assembly at a first location, the assembly comprising the first layer, a third layer, and a second layer positioned intermediate the first layer and a third layer, wherein the first layer, the third layer, and the fastener are electrically conductive, wherein the second layer defines a gap and the first location is in communication with the gap, and wherein a material of the second layer differs from a material of the first layer or a material of the third layer;
contacting an electrode of a resistance welding device with the fastener and forming an electrically conductive pathway between the electrode, the fastener, and the assembly;
fastening the first layer to the third layer, wherein the fastening comprises resistance welding the fastener to the third layer through the gap in the second layer with the fastener utilizing the electrode, wherein a metallurgical bond forms between the fastener and the third layer; and
fastening the second layer to the first layer or the third layer, wherein the fastening comprises resistance welding the second layer to the first layer or the third layer utilizing the electrode, wherein a metallurgical bond forms between the second layer and the first layer or the third layer.

18. The method of claim 17, wherein resistance welding the fastener to the third layer through the gap in the second layer comprises deforming the first layer at the first location into the gap.

19. The method of claim 18, wherein after deforming the first layer a head of the fastener is at least partially positioned within a recess formed in the first layer by deforming the first layer.

20. A method for fastening, the method comprising:
contacting a fastener with a first layer of an assembly at a first location, the assembly comprising the first layer, a third layer, and a second layer positioned intermediate the first layer and the third layer, wherein the first layer, the third layer, and the fastener are electrically conductive, and wherein the second layer defines a gap and the first location is in communication with the gap;
forming electrical communication between the assembly and the fastener; and
fastening the first layer to the third layer through the gap in the second layer with the fastener, wherein the fastening comprises resistance welding the fastener to the third layer;
wherein the second layer and the first layer or the third layer comprise the same material; and
further comprising resistance welding the second layer to the first layer or the third layer thereby forming a metallurgical bond.

21. A method for fastening, the method comprising:
contacting a fastener with a first layer of an assembly at a first location, the assembly comprising the first layer, a third layer, and a second layer positioned intermediate the first layer and the third layer, wherein the first layer, the third layer, and the fastener are electrically conductive, and wherein the second layer defines a gap and the first location is in communication with the gap;
forming electrical communication between the assembly and the fastener; and fastening the first layer to the third layer through the gap in the second layer with the fastener, wherein the fastening comprises resistance welding the fastener to the third layer;

wherein resistance welding the fastener to the third layer comprises:

applying an electrical potential across the assembly and the fastener, thereby resistance heating and softening the first location of the first layer;

urging the fastener through the first layer at the first location toward the third layer; and contacting the fastener and the third layer and resistance welding the fastener to the third layer, thereby forming a metallurgical bond between the fastener and the third layer.

* * * * *